(12) United States Patent
Gullickson, III (10) Patent No.: US 10,657,616 B2
(45) Date of Patent: *May 19, 2020

(54) SYSTEM AND METHOD FOR MONITORING AND REPORTING A PERSON'S PHONE USAGE WHILE DRIVING

(71) Applicant: Copernicus, LLC, Minneapolis, MN (US)

(72) Inventor: Glenn Gullickson, III, Edina, MN (US)

(73) Assignee: Copernicus, LLC, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/526,324

(22) Filed: Jul. 30, 2019

(65) Prior Publication Data

US 2020/0027182 A1     Jan. 23, 2020

Related U.S. Application Data

(63) Continuation of application No. 16/060,159, filed as application No. PCT/US2016/065539 on Dec. 8, 2016, now Pat. No. 10,380,710.

(Continued)

(51) Int. Cl.
| | |
|---|---|
| *G06Q 50/26* | (2012.01) |
| *G06Q 10/10* | (2012.01) |
| *H04M 15/00* | (2006.01) |
| *H04M 15/28* | (2006.01) |
| *G06F 11/30* | (2006.01) |

(Continued)

(52) U.S. Cl.
CPC ....... *G06Q 50/265* (2013.01); *G06F 11/3006* (2013.01); *G06F 11/3438* (2013.01); *G06F 21/6209* (2013.01); *G06Q 10/10* (2013.01); *H04M 15/00* (2013.01); *H04M 15/28* (2013.01); *H04M 15/58* (2013.01); *H04M 15/8033* (2013.01); *H04W 4/026* (2013.01); *H04W 4/027* (2013.01); *H04W 4/24* (2013.01); *H04M 1/72577* (2013.01)

(58) Field of Classification Search
CPC .................................................... G06Q 50/265
USPC ........................................................ 455/414.1
See application file for complete search history.

(56) References Cited

U.S. PATENT DOCUMENTS

| | | |
|---|---|---|
| 6,583,894 B1 | 6/2003 | Sawaki |
| 6,771,946 B1 | 8/2004 | Oysaki |

(Continued)

FOREIGN PATENT DOCUMENTS

| | | |
|---|---|---|
| KR | 1020100102605 | 9/2010 |
| KR | 1020170022752 | 3/2017 |

(Continued)

OTHER PUBLICATIONS

International Search Report and Written Opinion for PCT/US16/65539 dated May 18, 2017.

(Continued)

*Primary Examiner* — Joel Ajayi
(74) *Attorney, Agent, or Firm* — Patterson Thuente Pedersen, P.A.

(57) ABSTRACT

A system and method for monitoring, analyzing, and reporting cell phone usage. Multiple sensors provide inputs related to the interaction between a cell phone user and a cell phone. The inputs from the sensors are compared to normative data, and an output indicative of the operating environment of the cell phone is provided.

5 Claims, 4 Drawing Sheets

Related U.S. Application Data (60) Provisional application No. 62/265,013, filed on Dec. 9, 2015.

(51) Int. Cl.
| | |
|---|---|
| *G06F 11/34* | (2006.01) |
| *G06F 21/62* | (2013.01) |
| *H04W 4/02* | (2018.01) |
| *H04W 4/24* | (2018.01) |
| *H04M 1/725* | (2006.01) |

(56) References Cited

U.S. PATENT DOCUMENTS

| | | |
|---|---|---|
| 7,876,205 B2 | 1/2011 | Catten et al. |
| 8,270,933 B2 | 9/2012 | Riemer et al. |
| 8,290,480 B2 | 10/2012 | Abramson et al. |
| 8,781,457 B2 | 7/2014 | Randazzo et al. |
| 8,838,088 B1 | 9/2014 | Henn et al. |
| 9,037,125 B1 | 5/2015 | Kadous |
| 9,078,116 B2 | 7/2015 | Abramson et al. |
| 9,165,547 B2 | 10/2015 | Nguyen et al. |
| 9,208,390 B2 | 12/2015 | Ludick |
| 9,501,292 B2 | 11/2016 | Levy et al. |
| 9,516,492 B2 | 12/2016 | Miller et al. |
| 9,541,642 B2 | 1/2017 | Karl |
| 10,380,710 B2 | 8/2019 | Gullickson |
| 2010/0079382 A1 | 4/2010 | Suggs |
| 2011/0021234 A1 | 1/2011 | Tibbitts et al. |
| 2011/0065456 A1 | 3/2011 | Brennan et al. |
| 2012/0006610 A1 | 1/2012 | Wallace et al. |
| 2012/0040665 A1 | 2/2012 | Liu et al. |
| 2012/0053805 A1 | 3/2012 | Dantu |
| 2012/0115413 A1 | 5/2012 | Czaja et al. |
| 2012/0231773 A1 | 9/2012 | Lipovski |
| 2013/0143521 A1 | 6/2013 | Hernandez et al. |
| 2013/0281079 A1 | 10/2013 | Vidal et al. |
| 2014/0287738 A1 | 9/2014 | Abramson et al. |
| 2015/0139058 A1 | 5/2015 | Xia |
| 2015/0148019 A1 | 5/2015 | Michaelis |
| 2015/0195705 A1 | 7/2015 | Mullins |
| 2015/0256996 A1 | 9/2015 | Allen et al. |
| 2016/0021238 A1 | 1/2016 | Abramson et al. |
| 2016/0036957 A1 | 2/2016 | Van Meter |
| 2016/0088146 A1 | 3/2016 | Ying et al. |

FOREIGN PATENT DOCUMENTS

| | | |
|---|---|---|
| WO | WO 2011085250 | 7/2011 |
| WO | WO 2013181310 | 12/2013 |
| WO | WO 2014072935 | 5/2014 |
| WO | WO 2016210181 | 12/2016 |

OTHER PUBLICATIONS

"Smartphone Use While Driving Grows Beyond Texting to Social Media, Web Surfing, Selfies, Video Chatting", May 19, 2015, available on the AT&T website at http://about.att.com/story/smartphone_use_while_driving_grows_beyond_texting.html (last accessed Jun. 7, 2018).

James Gempler and Lindsay Mancini, "Smart Phones, Dumb Driving, and the Law: The Criminal and Civil Consequences of Distracted Driving", Bench & Bar of Minnesota, Nov. 2016.

Neal Boudette, "Auto Safety Regulators Seek a Driver Mode to Block Apps" New York Times, Nov. 22, 2016.

Application and File history for U.S. Appl. No. 16/060,159, filed Jun. 7, 2018. Inventor: Gullickson.

SYSTEM AND METHOD FOR MONITORING AND REPORTING A PERSON'S PHONE USAGE WHILE DRIVING

RELATED APPLICATIONS

This application is a continuation of application Ser. No. 16/060,159 filed Jun. 7, 2018, which is a National Phase entry of PCT Application No. PCT/US16/65539 filed Dec. 8, 2016, which claims the benefit of U.S. Provisional Application No. 62/265,013 filed Dec. 9, 2015, each which is hereby incorporated herein in its entirety by reference.

TECHNICAL FIELD

The present invention relates generally to a mobile phone. More specifically, the present invention relates to a system and method for monitoring interruptions and distractions in a person's mobile phone usage, including detecting and reporting a person's mobile phone usage while driving.

BACKGROUND

Distracted driving is an activity that can divert a person's attention away from the primary task of driving. There are many types of distractions that can endanger a driver, their passengers, other drivers and bystanders. The most pervasive distraction is text messaging because it requires visual, manual, and cognitive attention from the driver. The following data from the web site Distraction.Gov highlights the importance of the invention to identify, monitor, and change phone usage behavior while driving:

- 10% of all drivers under the age of 20 involved in fatal crashes were reported as distracted at the time of the crash. This age group has the largest proportion of drivers who were distracted.
- At any given daylight moment across America, approximately 660,000 drivers are using cell phones or manipulating electronic devices while driving, a number that has held steady since 2010. (NOPUS) Drivers in their 20s make up 27 percent of the distracted drivers in fatal crashes. (NHTSA)
- Engaging in visual-manual subtasks (such as reaching for a phone, dialing and texting) associated with the use of hand-held phones and other portable devices increased the risk of getting into a crash by three times. (VTTI)
- Five seconds is the average time your eyes are off the road while texting. When traveling at 55 mph, that's enough time to cover the length of a football field blindfolded. (2009, VTTI)
- A quarter of teens respond to a text message once or more every time they drive. 20 percent of teens and 10 percent of parents admit that they have extended, multi-message text conversations while driving. (UM-TRI)

Handheld mobile phones, or cell phones for short, were introduced in the 1970's and their popularity and use with consumers grew through the 1980's and 90's. Whereas their original purpose was for voice communications, text messaging and photography were eventually added as capabilities to these devices, further increasing their popularity with consumers. Cellular radio networks advanced from analog to digital, and the speed and capability of the digital networks improved as did the geographical coverage across the United States and many other nations throughout the 1990's and into the twenty-first century. Meanwhile, the capability of mobile phones continued to improve along with the related advancements in microelectronics, computers, cameras, and data storage. Accordingly, the most popular style of cell phone is now the "smart phone", a handheld mobile phone that generally includes a cellular phone capable of providing voice communications as well as a color graphical screen with touchscreen capability for user input, one or more cameras that may be capable of taking still and video photography, a computer processor, flash memory for data storage, a GPS receiver, and the necessary internal antennas for receiving and/or transmitting on potentially several different bands. Therefore, the smart phone may have the ability to send and receive basic or multimedia text messages and email messages, record and play audio and video, receive GPS signals and provide navigation assistance, and process a virtually unlimited number of software applications ("apps" for short) for the smart phone user.

The broader category of mobile electronic devices generally includes cell phones, smart phones, and tablet computers. Many of the software applications (apps) that are developed for smart phones may also be used on tablet computers, which are available in a variety of sizes ranging from palm-sized to nearly the size of a laptop computer, and tablet computers may have the ability to communicate over a cellular data network, thereby enabling their use for operating software applications on roadways and highways much in the same manner as smart phones. Accordingly, all mobile electronic devices, including those described above, have the potential of being able to distract a driver who is using it, while also being able to operate software applications that detect and monitor the physical environment of the device as well as the device operator's interaction with that device.

In an effort to monitor and/or prevent the operation of a mobile device by the driver of a vehicle, several applications have been developed which utilize a variety of possible approaches. One approach has been to interface a mobile phone with electronics that are installed in a vehicle, thereby utilizing indications from the vehicle that it is being driven. For example, U.S. Pat. No. 9,294,603 B2 (Fischer) utilizes the position of the vehicle's gearshift lever and information from the vehicle's engine control unit to detect is the vehicle is being driven, thereby inhibiting some of the functionality of the mobile phone that it interfaces to. Another popular approach utilizes the GPS receiver on the mobile phone to detect the speed of the device, thereby giving an indication it is in a moving vehicle. For example, U.S. Pat. No. 8,270,933 B2 (Reiemer) inhibits selected functionality on the mobile phone if the GPS indication of speed exceeds a certain threshold value. An obvious disadvantage of this approach is that all mobile phones within a moving vehicle, and not only that of the driver, would be affected by this system. An improvement on this design is to use the indication of vehicle speed and to create a zone of device usage exclusion only around the driver. For example, U.S. Application 2012-0231773 A1 (Lipovski) utilizes a method of utilizing an ultrasonic signal to determine if the cellphone is in a zone in a moving vehicle, with such a zone being the space around the driver, and preventing drivers from texting when the vehicle is in motion.

Other approaches have been aimed at the use of mobile phones by minors, utilizing a third-party control system that a parent or other adult operates to enable or disable features on the mobile phone. For example, U.S. Application 2015-0195705 A1 (Mullins) requires a secondary computer or mobile device that is accessed by a parent who may disable some or all of the functionality of a minor's mobile phone based on time of day or the speed of the device. Approaches utilizing a third-party control system similar to this are often referred to as "nanny controls" because they are generally intended for mobile devices that are used by minors, or by employees when either a mobile device or a vehicle, or both, are provided by an employer. However, this approach lacks the ability to determine if a mobile device is being used by a person who is driving a vehicle.

A more sophisticated approach would be to utilize the computer on the mobile device to implement a software application on the device that monitors the user's input to the device to determine if the device is being operated by vehicle driver. For example, U.S. Application 2015-0148019 A1 (Michaelis) utilizes two different methods: one requires that the user of a device utilize two hands for device input if the speed of the device is above a certain threshold, and the other analyzes the cadence of keypad or touch screen input by the operator to determine if the typing input is "bursty" as indicated by the entry of a group of characters, followed by a pause, before the entry of additional groups of characters, while also evaluating whether the device is moving at greater than a certain threshold speed. While this approach may be better at detecting whether a mobile device is being used by the driver of a moving vehicle than other approaches, it lacks the ability to analyze the entire cadence of the user's keypad or touch screen input including error rate and typing corrections, and it also lacks the ability to utilize all of the internal and external environmental sensors on the mobile device to discern if it is being used by the driver of a vehicle.

SUMMARY OF THE DISCLOSURE

The problems outlined above have garnered the attention of both the legal and the mobile device provider communities, and are in large measure addressed by the present invention. AT&T, a large cellular network carrier, reported the results of a survey in 2015 showing that 62% of drivers keep their smartphone within reach while driving, and that drivers have admitted to performing the following activities on their smartphone while driving: texting, emailing, web surfing, social networking, taking photographs and videos, and video chatting. (See, "Smartphone Use While Driving Grows Beyond Texting to Social Media, Web Surfing, Selfies, Video Chatting", May 19, 2015, available on the AT&T website at http://about.att.com/story/smartphone_use_while_driving_grows_beyond_texting.html (last accessed Nov. 23, 2016), and later reported in an article by James Gempler and Lindsay Mancini, "Smart Phones, Dumb Driving, and the Law: The Criminal and Civil Consequences of Distracted Driving", pp. 20-24, Bench & Bar of Minnesota, November 2016.) The National Highway Traffic Safety Administration reported that highway deaths have increased 10.4 percent during the first six months of 2016, and cited distracted driving as a factor behind this increase with smartphones, other devices, and in-car electronics being leading causes of driver distractions, and have stated their plans to challenge mobile electronic device manufacturers to design future operating systems that limit the functionality and simplify user interfaces of mobile devices while a vehicle is in motion, and to develop technology to identify when the devices are being used by a driver while driving. (See, Neil Boudette, "Regulators Want Devices Like iPhones to Add a Driver Mode to Limit Distractions", pp. B1-B2, New York Times, Nov. 23, 2016.

An embodiment of the present invention addresses these challenges with a system and application that collects and analyzes data from multiple phone sources including accelerometers, position sensors, and keypad or touch screen input including typing speed, pauses, misspellings, other errors, backspaces, and word capitalization, as well as external input received by the phone including GPS signals for location, speed, and direction. In an embodiment of the present invention, the system may collect and analyze: 1) typing or touching the screen at various speeds of the device including at rest, moving slowly/walking/running, changing speeds such as accelerating and decelerating, moving at a generally constant speed with some variation such as driving on a highway or a city road; 2) the cadence of the typing and/or screen touches at various speeds including typing speed and pauses between characters and groups of characters; 3) the number of backspaces and typing errors at various speeds; 4) the GPS position, speed, and direction of travel of the mobile device; 5) the physical attitude of the mobile device including pitch, roll, and yaw of the mobile device and changes to it; and 6) the magnitude and periodicity of shock and motion of the mobile device from accelerometers.

In one embodiment, the system will collect and analyze data by use of an external server that receives data from the mobile device where the data is collected on the server, processed, and analyzed by an algorithm that categorizes the typing and screen touching at various speeds, and correlates that data with the corresponding typing and screen touching cadence of the person using the phone. The data may either be transmitted from the mobile device continuously or periodically in packets of data, or in a single transmission at the end of a keyboard session. Over time, the algorithm will build a profile of a person's phone usage at various speeds and delineate, with high probability, a person's phone usage in a car as a driver and/or as a passenger, while being able to report the results of the analysis either to the device user, a third party, or both.

In another embodiment, the system will collect and analyze data by use of an application that is installed on the mobile device and which runs in the background to process and analyze the device data using an algorithm that categorizes the typing and screen touching at various speeds, and correlates that data with the corresponding typing and screen touching cadence of the person using the phone.

Over time, the algorithm will build a profile of a person's phone usage at various speeds and delineate, with high probability, a person's phone usage in a car as a driver and/or as a passenger, while being able to report the results of the analysis either to the device user, a third party, or both.

In an embodiment of the invention, the mobile device may be programmed to inhibit certain functions when it is detected that the device is being used by a driver whose attention is shared by the usage of the device and the process of driving the vehicle. The programming of this functionality may be controlled from the mobile device or from an independent computer or mobile device, and it may be controlled by the mobile device user or by a third party such as a parent, insurance provider, employer, or government agency.

In an embodiment of the invention, the results of the data analysis may be used for reporting to the device user or to third parties. Reporting may be provided by an email report that is sent to a designated recipient periodically, such as daily, weekly, or monthly, or which may be requested on demand by an authorized recipient. Examples of third parties who receive these reports may include parents, insurance providers, employers, and law enforcement agencies. In an embodiment of the invention, the results of the data analysis may be available for viewing or downloading from a database, website, or other location where the data may be located.

In other embodiments of the invention, sanitized versions of the data, i.e., where user identifiable information has been removed, may be made available to various agencies for the purpose of analyzing mobile device user behavior, particularly with regard to distracted driving behavior.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention. For example, the system disclosed could be used on mobile electronic devices other than cell phones, and it could also be used on other electronics systems that may be contained on or within vehicles such as automobiles, motorcycles, airplanes, railroad locomotives, and construction equipment. Moreover, the system disclosed could be utilized on mobile electronic devices and other computer equipment to detect if the user of this equipment is distracted by other activities that may impede either the proper operation of those devices or the fulfillment of other responsibilities.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which.

While embodiments of the disclosure are amenable to various modifications and alternative forms, specifics thereof have by shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure as defined by the appended claims.

DETAILED DESCRIPTION

The Smartphone Usage Profiling System (SUPS) is designed to monitor interruptions and distractions in a person's mobile phone usage, including detecting and reporting a person's mobile phone usage while driving, by analyzing the cadence of keyboard strokes or touchscreen touches and other situational and environmental data that is available to the smartphone. Once the application is installed on a smartphone or other mobile device, it will collect these data during a keyboard session with a user for use by the analytical and reporting components of the system. The embodiment of the invention depicted in these figures utilizes an external database and analysis system, thereby requiring transmission of the smartphone usage data from the smartphone device to the database. This embodiment may be understood by referring to the figures.

Figure 1:
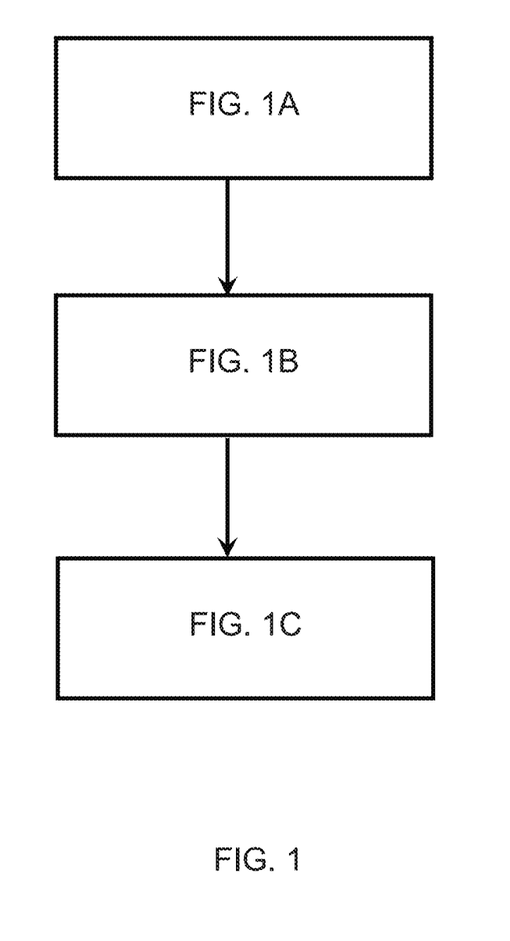
FIG. 1 depicts the interrelationship of FIGS. 1A, 1B, and 1C, together which comprise a flowchart of the processes performed during an embodiment of the invention.
Figure 1A:
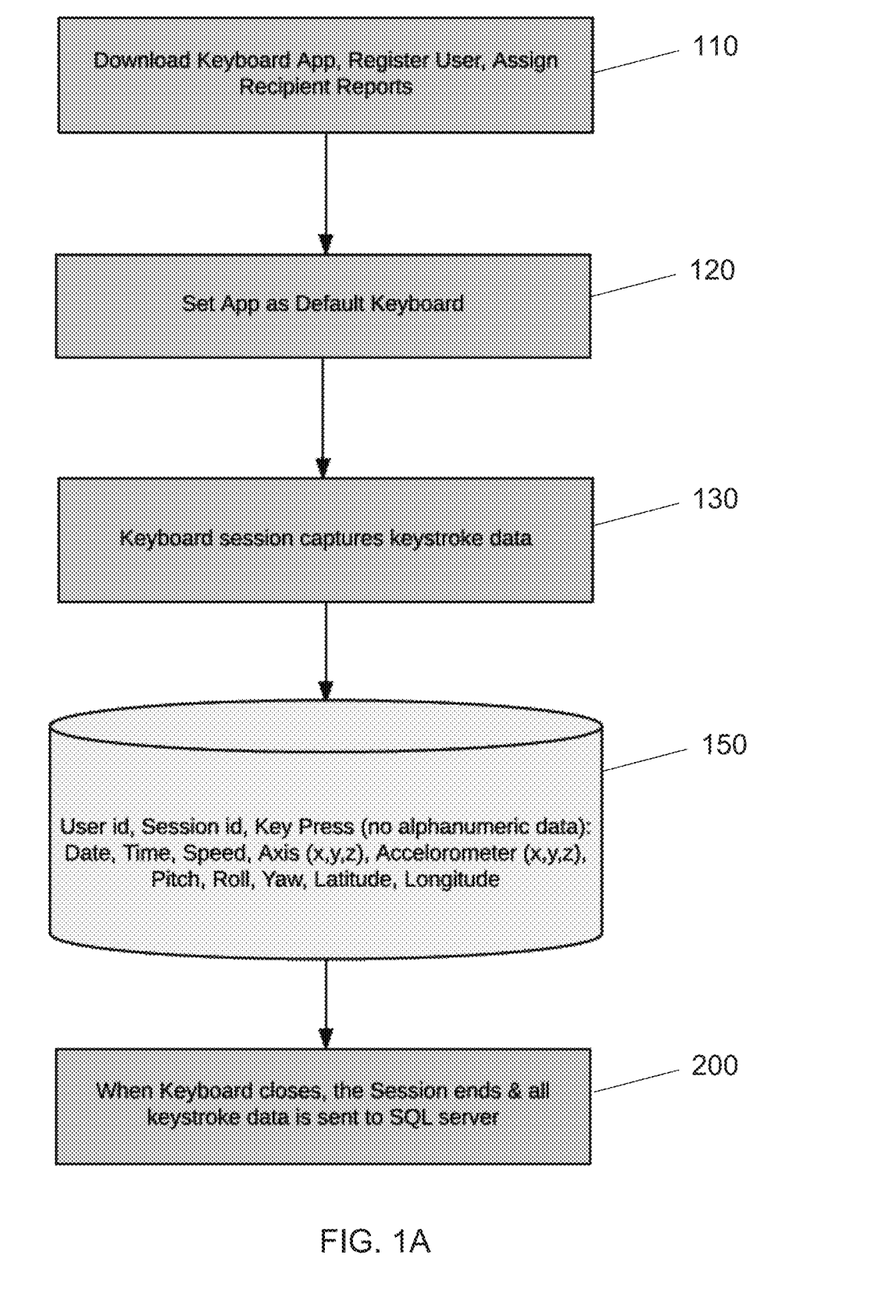
FIG. 1A is a flowchart depicting the steps taken by a user to download a portion of the system, approve access to the data, designate recipient's summary reports, and set keyboard app as the default keyboard for the user's smartphone in accordance with an embodiment of the invention.

Referring to FIG. 1A, a flowchart depicting the steps taken by a user to download a portion of the system to the smartphone to perform the data collection process. The installation step 110 is comprised of downloading the keyboard application (app), registering the user, and assigning recipient reports. The application may be downloaded from any third party system where the Smartphone Usage Profiling System (SUPS) app is made available for download by mobile devices. The user registers with the system, and authorizes the assignment of recipients to receive, or to access, the reports generated by the system. In certain embodiments, the reports or portions thereof may be required to be made available to third parties (examples may include parents in the case of a minor, an insurance provider, or an employer.) In these cases, the user may be required to acknowledge the existence of these third party report recipients. Once the SUPS system is installed on a mobile device, it will remain operational during all subsequent usage sessions with the smartphone.

The initialize step 120 occurs each time the user engages with the smartphone. This may occur by turning the smartphone on, taking it out of a sleep mode, or by unlocking the keyboard for a usage session. During the initialize step 120, the SUPS app is set as the default keyboard on the smartphone and will therefore monitor all smartphone usage including keyboard strokes, touchscreen touches, and other situational and environmental data that is available to the smartphone. In the embodiment depicted, thirteen unique data variables are captured and stored for each keyboard stroke or touchscreen touch: User ID, Session ID, Key Press (no alphanumeric data), Date, Time, Speed, Axis (x,y,z), Accelerometer (x,y,z), Pitch, Roll, Yaw, Latitude, and Longitude.

The keyboard session 130 describes the period of time that corresponds to the entire smartphone usage session by the user, which may vary widely depending on the nature of smartphone usage by the user. During the keyboard session 130, a plurality of data variables are being continuously captured and stored for each keyboard stroke or touchscreen touch. These data variables comprise a data set 150, which accumulates during the course of the user's keyboard session 130. In the embodiment depicted, the data set 150 is comprised of these data parameters for each keystroke: User ID, Session ID, Key Press (no alphanumeric data), Date, Time, Speed, Axis (x,y,z), Accelerometer (x,y,z), Pitch, Roll, Yaw, Latitude, and Longitude. Those who are skilled in the art will appreciate that many of these parameters are generated internally by the mobile device, and that their names and descriptions may vary with the mobile device platform and installed operating system. It is also to be understood that not every data parameter may be measured and reported with every keystroke. For example, device latitude and longitude are inputs that are taken from the Global Positioning System (GPS) system that is generally available in most mobile devices, said GPS system being dependent on the availability of clear signals being transmitted from the constellation of orbiting GPS satellites for proper system operation.

Under most usage conditions the keyboard session 130 ends when the keyboard application is removed from the touchscreen, or when some other action which may be device dependent is invoked to signal the end of the keyboard session 130. When the keyboard session 130 ends, session end 200 occurs. Session end 200 is the signal to the SUPS system to transmit the dataset 150 to the analysis portion of the SUPS system. In the embodiment depicted, the dataset 150 is transmitted to an external database that is linked to a Structured Query Language (SQL) server which performs the analysis. In one embodiment, the data transmission may occur over the cellular data network. In other embodiments the data transmission may occur at a later time over a wireless (wi-fi) data network, or by a data cable attached to the smartphone for performing data transfer. In the embodiment depicted, where an external database is utilized, the external database may be hosted by a third-party as a Software as a Service, commonly referred to those who are skilled in the art as a "cloud computing" system. In other embodiments, where the mobile device may be comprised of a processor and memory that is sufficient for the purpose, data processing and analysis may be performed entirely within the smartphone.

Figure 1B:
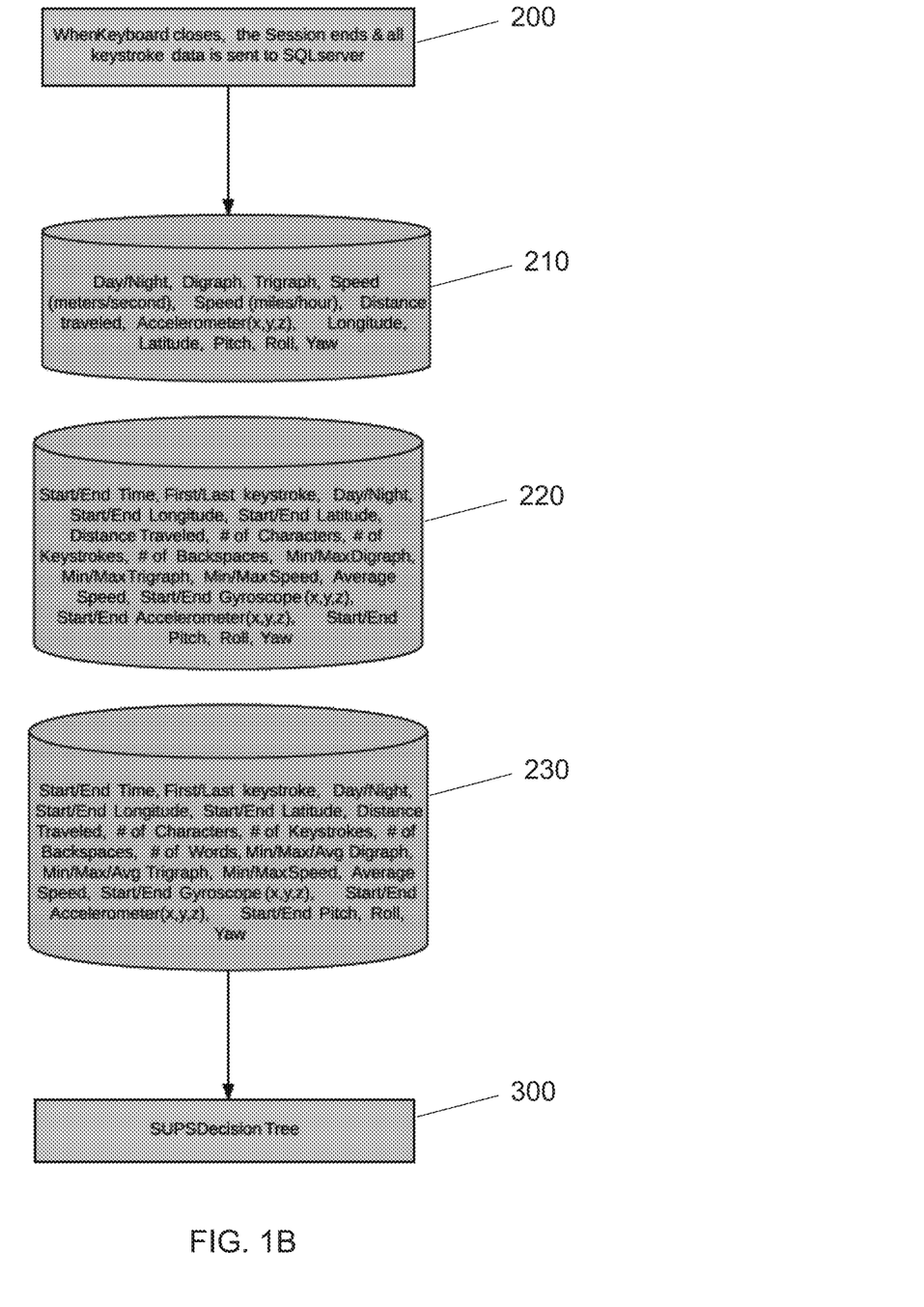
FIG. 1B is a flowchart depicting the steps performed by the Smartphone Usage Profiling System after the smartphone session ends and the keystroke data are sent to the database for analysis in accordance with an embodiment of the of the invention.

Referring to FIG. 1B, a flowchart and functional block diagram depicting the generation of the usage metrics dataset by the SUPS system. As noted earlier, session end 200 invokes the transmission of the dataset 150 to the SUPS analysis engine which generates and maintains three individual data tables in the SQL database. The keystroke specific dataset 210 stores data parameters that are specific to each keyboard keystroke or touchscreen touch. In the illustrated embodiment, these data parameters include Day/Night mode, Digraph, Trigraph, Speed (meters/second or miles/hour), Distance traveled, triaxial Accelerometer magnitude (x,y,z), Longitude, Latitude, Pitch, Roll, and Yaw.

The word specific dataset 220 stores data parameters that describe each word, or each series of keystrokes, that is entered by the user. The analysis engine may utilize a plurality of algorithms to identify each word for the word specific dataset 220, including use of spaces, punctuation marks, and time duration. In the illustrated embodiment, these data parameters include Start/End Time, First/Last Keystroke, Day/Night mode, Start/End Longitude, Start/End Latitude, Distance Traveled, Number of Characters, Number of Keystrokes, Number of Backspaces, Min/Max Digraph, Min/Max Trigraph, Min/Max Speed, Average Speed, Start/End Gyroscope (x,y,z), Start/End Accelerometer (x,y,z), Start/End Pitch, Roll, and Yaw.

The session specific dataset 230 stores data parameters that describe each user session in interacting with the smartphone, otherwise known as the keyboard session 130. In the illustrated embodiment, these data parameters include Start/End Time, First/Last keystroke, Day/Night, Start/End Longitude, Start/End Latitude, Distance Traveled, Number of Characters, Number of Keystrokes, Number of Backspaces, Number of Words, Min/Max/Avg Digraph, Min/Max/Avg Trigraph, Min/Max Speed, Average Speed, Start/End Gyroscope (x,y,z), Start/End Accelerometer (x,y,z), Start/End Pitch, Roll, and Yaw.

An example of the data captured for each keystroke in a particular embodiment is disclosed in Appendix A. Examples of the SQL data tables created for the keystroke specific dataset 210, word specific dataset 220, and session specific dataset 230 for a particular embodiment are disclosed in Appendix B.

Data that are contained in the keystroke specific dataset 210, word specific dataset 220, and session specific dataset 230 are input to the SUPS decision tree 300 for analysis.

Figure 1C:
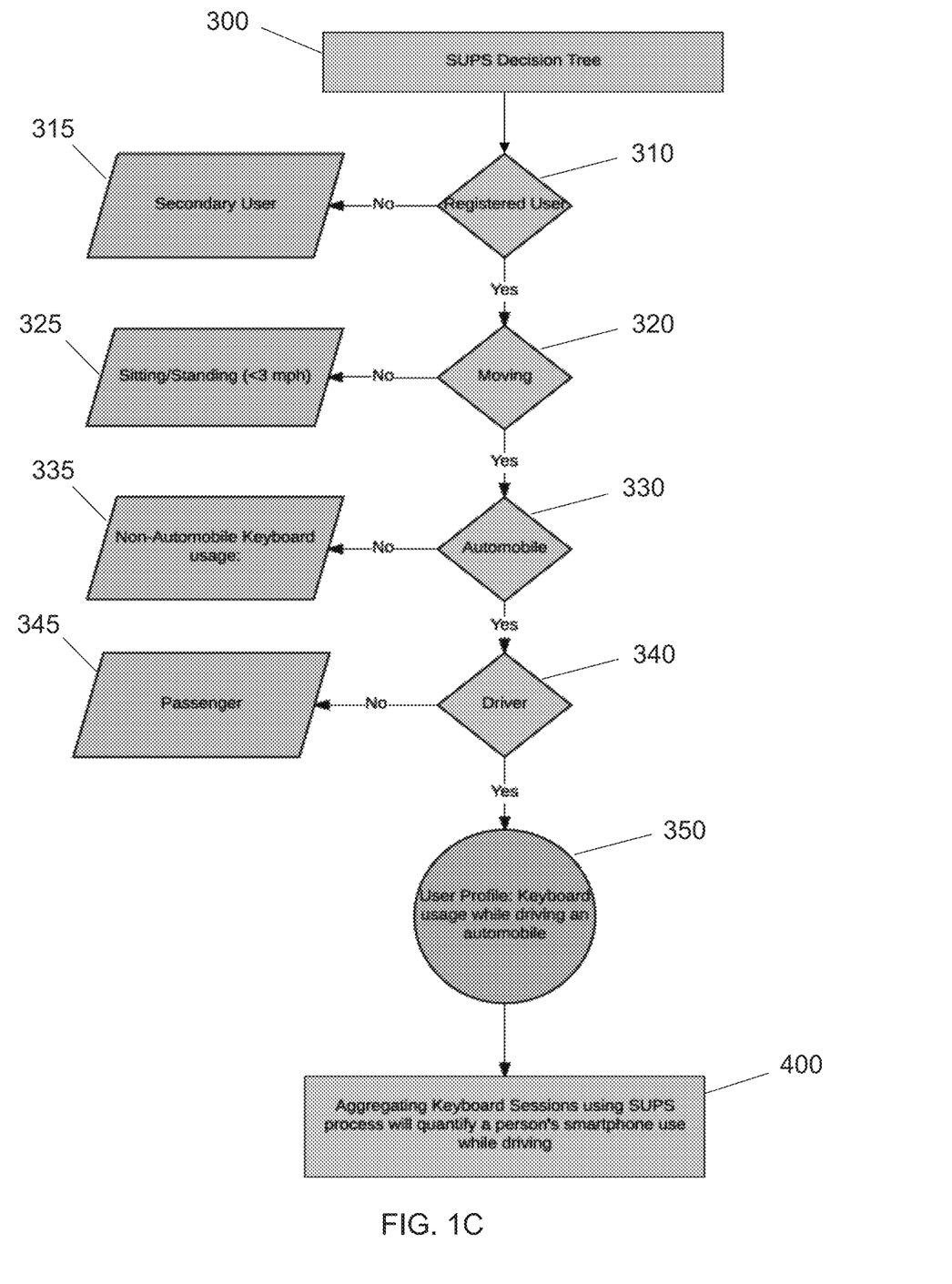
FIG. 1C is a flowchart depicting the steps performed by the Smartphone Usage Profiling System decision tree to analyze the smartphone data and determine a usage profile in accordance with an embodiment of the invention.

Referring to FIG. 1C, a flowchart and functional block diagram depicting the decisions that are made within the SUPS decision tree 300 for a particular embodiment. The registered user decision point 310 analyzes the user keystroke pattern to determine if the keyboard session 130 is occurring with a registered user, or with a secondary user 315. The moving decision point 320 determines if the smartphone and user are moving or not. In the depicted embodiment, a speed less than 3 miles per hour (MPH) as determined by the GPS speed parameter is used to determine that the user is sitting/standing 325. Those who are skilled in the art will appreciate that other speed thresholds may be used for this determination. The automobile decision point 330 utilizes data from multiple datasets to determine if the user and smartphone are moving in an automobile. In the depicted embodiment, parameters that are used to make this determination include Keystroke Pattern Changes, Location Changes, and Phone Positioning. If the SUPS decision tree 300 determines that the smartphone usage is not occurring in an automobile, then it is determined to be non-automobile keyboard usage 335. In the depicted embodiment, examples of non-automobile keyboard usage 335 may include riding on a train, taxi, or bicycle, or running. The driver decision point 350 determines if the smartphone user is the driver of an automobile or not. In the depicted embodiment, parameters that are used to make this determination include Keystroke Pattern Changes, Location Changes, and Phone Positioning. If the SUPS decision tree 300 determines that the smartphone usage is not occurring by a driver in an automobile, then it is determined to be a passenger 345. If the SUPS decision tree 300 determines that the smartphone usage is occurring by a driver in an automobile, the profile data and other parameters are provided by the SUPS decision tree 300 to the user profile 350, which records and maintains a record of all smartphone usage by the user when in the role of driver of an automobile. The SUPS system utilizes all data that is obtained for smartphone usage by the user when in the role of driver of an automobile in the aggregating keyboard sessions 400 process within the system.

As the mobile data is collected and analyzed, the data is categorized by the aggregating keyboard sessions 400 process based on usage at various speeds and modes of movement. A profiling algorithm will identify changes in the user's cadence and error rate at various speeds and modes of movement. Over time, as data accumulates, the profiling algorithm will correlate the data to determine the probability of whether a mobile phone user is texting and driving or texting as a passenger. In the embodiment depicted, the SUPS system will issue a report for a specific period (e.g., one week or one month) that summarizes the data collected and categorizes the user's usage in various modes of movement. The report is sent via email to the designated recipients that were determined in the registration process. In other embodiments, the report may be made available to the user or to authorized third parties by accessing a database where the reports are stored.

The embodiments above are intended to be illustrative and not limiting. Additional embodiments are encompassed within the scope of the claims. Although the present invention has been described with reference to particular embodiments, those skilled in the art will recognize that changes may be made in form and detail without departing from the spirit and scope of the invention.

Various embodiments of the present disclosure have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of embodiments.

In one embodiment, a mobile application collects mobile phone usage data specific to typing, screen touches, device inclination and orientation including pitch, roll, and yaw, and other data related to texting, typing, or screen usage. The collected data is then categorized based on the corresponding speed and level of movement. A profiling algorithm will measure, compare, and categorize changes in the data in different modes of movement. For instance, the typing cadence that is specific to a mobile phone user while sitting at a desk versus walking is distinctly different. Similarly, a person who texts as a passenger in a car versus while driving, their cadence, position changes, and phone usage will also be distinctly different. The profiling algorithm will use the collected data to build a profile of the user in distinctly different modes of movement. A summary report will show, based on a specific time period, the actual number and percentage usage at different modes of movement. Based on the output of the profiling algorithm, the report will show the number or times the user is texting and driving with their mobile phone.

Following is code developed for an embodiment of the invention to define the specific user data collected for one keystroke press, which are sent to a cloud database that is linked to a SQL server which allows for analysis of each user's keystroke behavior.

```
Code set 1
{ "results": [
    {
    "Character": "t",
        "Location": {
            " type": "GeoPoint",
            "latitude": 44.90551436789791,
            "longitude": -93.38828821675236
    },
    "Speed": 0,
    "User": "D5BCD7F5-33FB-4904-885A-20737F6C22CE",
    "axisX": -0.07313892564906413,
    "axisY": -0.01081749403179286, "axisZ": -
    0.1218979430989979, "createdAt": "2015-
    08-01T19:56:06.820Z", "objectId":
    "001VccyILy",
    "updatedAt": "2015-08-01T19:56:06.820Z"
},
Code set 2
{
"ActivityTypeId" : 1,
"Character" : "Backspace",
"Latitude" : 1.1,
"Longitude" : 1.1,
"TimeLogged" : "2016-09-21 14:03:09.297",
"Speed" : 1.1,
"AxisX" : 1.1,
"AxisY" : 1.1,
"AxisZ" : 1.1,
"Yaw" : 1.1,
"Pitch" : 1.1,
```

-continued

```
"Roll" : 1.1,
"AccelerometerX" : 1.1,
"AccelerometerY" : 1.1,
"AccelerometerZ" : 1.1
},
{
"ActivityTypeId" : 1,
"Character" : "Backspace",
"Latitude" : 1.1,
"Longitude" : 1.1,
"TimeLogged" : "2016-09-21 14:03:09.297",
"Speed" : 1.1,
"AxisX" : 1.1,
"AxisY" : 1.1,
"AxisZ" : 1.1,
"Yaw" : 1.1,
"Pitch" : 1.1,
"Roll" : 1.1,
"AccelerometerX" : 1.1,
"AccelerometerY" : 1.1,
"AccelerometerZ" : 1.1
}
```

Following is code developed for an embodiment of the invention to create data tables for determining the Usage Metrics for each Keystroke, Word, and Session.

```
...Clients\Copernicus\3Data\SQL\Table ExternalTables.sql 1
CREATE EXTERNAL TABLE [dbo].[APIActivityType]
    (
    ID int not null,
    ActivityTypeName nvarchar(50)
    )
CREATE EXTERNAL TABLE [dbo].[APIDataLog]
    (
    ID int not null,
    ActivityTypeID int,
    [Character] nvarchar(256),
    TimeLogged datetime,
    Speed float,
    AxisX float,
    AxisY float,
    AxisZ float,
    AccelerometerX float,
    AccelerometerY float,
    AccelerometerZ float,
    Pitch float,
    Roll float,
    Yaw float,
    SessionID int,
    Latitude float,
    Longitude float
    )
CREATE EXTERNAL TABLE [dbo].[APISession]
    (
    ID int not null,
    CreatedTime datetime,
    UserGUID uniqueidentifier
    )
...feNet\Clients\Copernicus\3Data\SQL\Table Keystroke.sql 1
CREATE TABLE Keystroke
    (
    KeystrokeID int not null identity(1,1),
    DataLogID int,
    WordID int,
    SessionID int,
    DeviceID nvarchar(255),
    IndicatedActivity nvarchar(255),
    [Character] nvarchar(255),
    Keystroke nvarchar(255),
    TimeLogged datetime,
    DayPart nvarchar(255),
    Digraph float,
    Trigraph float,
    SpeedMetersPerSecond float,
    SpeedMPH float,
    DistanceTraveled float,
```

```
    GyroscopeX float,
    GyroscopeY float,
    GyroscopeZ float,
    AccelerometerX float,
    AccelerometerY float,
    AccelerometerZ float,
    Pitch float,
    Roll float,
    Yaw float,
    Latitude float,
    Longitude float
        ) ON [PRIMARY]
        C:\Users\tbrands\AppData\Local\Temp\~vsC404.sql 1
        CREATE TABLE Word
        (
        WordID int not null identity(1,1),
        SessionID nvarchar(255),
        DeviceID nvarchar(2000),
        FirstKeystrokeID int,
        LastKeystrokeID int,
        StartTime datetime,
        EndTime datetime,
        DayPart nvarchar(255),
        StartLat float,
        StartLong float,
        EndLat float,
        EndLong float,
        DistanceTraveled float,
        NumCharacters int,
        NumKeystrokes int,
        NumBackspaces int,
        MinDigraph float,
        MaxDigraph float,
        AvgDigraph float,
        MinTrigraph float,
        MaxTrigraph float,
        AvgTrigraph float,
        MinSpeedMPH float,
        MaxSpeedMPH float,
        AvgSpeedMPH float,
        StartGyroscopeX float,
        EndGyroscopeX float,
        StartGyroscopeY float,
        EndGyroscopeY float,
        StartGyroscopeZ float,
        EndGyroscopeZ float,
        StartAccelerometerX float,
        EndAccelerometerX float,
        StartAccelerometerY float,
        EndAccelerometerY float,
        StartAccelerometerZ float,
        EndAccelerometerZ float,
        StartPitch float,
        EndPitch float,
        StartRoll float,
        Endroll float,
        StartYaw float,
        EndYaw float,
        DeviceProfile nvarchar(255),
        IndicatedActivity nvarchar(255),
        CalculatedActivity nvarchar(255)
        )
C:\Users\tbrands\AppData\Local\Temp\~vsC404.sql 1
CREATE TABLE Session
        (
        SessionID int,
        DeviceID nvarchar(2000),
        StartTime datetime,
        EndTime datetime,
        DayPart nvarchar(255),
        StartLat float,
        StartLong float,
        EndLat float,
        EndLong float,
        DistanceTraveled float,
        NumWords nvarchar(255),
        NumCharacters int,
        NumKeystrokes int,
        NumBackspaces int,
        NumPunctuation int,
        MinDigraph float,
        MaxDigraph float,
        AvgDigraph float,
        MinTrigraph float,
        MaxTrigraph float,
        AvgTrigraph float,
        MinSpeedMPH float,
        MaxSpeedMPH float,
        AvgSpeedMPH float,
        StartGyroscopeX float,
        EndGyroscopeX float,
        StartGyroscopeY float,
        EndGyroscopeY float,
        StartGyroscopeZ float,
        EndGyroscopeZ float,
        StartAccelerometerX float,
        EndAccelerometerX float,
        StartAccelerometerY float,
        EndAccelerometerY float,
        StartAccelerometerZ float,
        EndAccelerometerZ float,
        StartPitch float,
        EndPitch float,
        StartRoll float,
        Endroll float,
        StartYaw float,
        EndYaw float,
        NumWordsStill int,
        NumWordsWalking int,
        NumWordsDriving int,
        NumWordsRiding int,
        IndicatedActivity nvarchar(255),
        CalculatedActivity nvarchar(255)
        )
```

Persons of ordinary skill in the relevant arts will recognize that embodiments may comprise fewer features than illustrated in any individual embodiment described above. The embodiments described herein are not meant to be an exhaustive presentation of the ways in which the various features may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

The invention claimed is:

1. A method of determining the probability of whether the user of a mobile phone is texting while operating a vehicle, including the steps of:
   downloading a superseding keyboard on to the mobile phone, the superseding keyboard configured to monitor usage data of the mobile phone;
   setting the superseding keyboard as a default keyboard on the mobile phone such that the superseding keyboard is used instead of the mobile phone's original operating system keyboard;

storing the usage data for each mobile phone usage occurrence using the superseding keyboard, the usage data including data relating to usage of the mobile phone while operating the vehicle at various speeds, the usage data including situational data unique to the user and environmental data relating to the physical environment of the mobile phone, the situational data further including keystroke specific data, word specific data, and session specific data, the environmental data including global positioning data;

creating a baseline user profile of the mobile phone user's vehicle keyboard usage pattern and non-vehicle keyboard usage pattern, the baseline user profile created by analyzing the stored usage data of the mobile phone usage occurrences;

monitor a real time mobile phone usage profile of the mobile phone user via the superseding keyboard, the real time mobile phone usage profile including current situational data and current environmental data; and comparing the real time mobile phone usage profile of the mobile phone user to the baseline user profile;

determining, based on the comparison between the real time mobile phone usage profile and the baseline user profile whether the user is operating a motor vehicle;

creating a report based on the determination of the probability of whether the user is operating a motor vehicle;

sending the report to an acknowledged third party recipient, the user, or the acknowledged third party recipient and the user.

2. The method as claimed in claim 1, the situational data and current situational data including data relating to keystroke patterns.

3. The method as claimed in claim 1, the situational data and current situational data including data relating to phone positioning.

4. The method as claimed in claim 1, the environmental data including location change of the mobile phone.

5. The method as claimed in claim 1, wherein storing the usage data of the mobile phone usage occurrence includes sending the usage data of the mobile phone usage occurrence to a structured query language server, the structured query language server capable of collecting and analyzing the plurality of usage data sets.

* * * * *